United States Patent [19]

Keren-Gill

[11] Patent Number: 4,911,548

[45] Date of Patent: Mar. 27, 1990

[54] DETERMINATION OF ONE OR MORE SPATIAL PARAMETERS OF AN OBJECT

[76] Inventor: Moshe Keren-Gill, 38 Jabotinsky Street, Givatayim 53 318, Israel

[21] Appl. No.: 26,568

[22] Filed: Mar. 17, 1987

[51] Int. Cl.⁴ .................... G01C 3/10; G01C 3/08; G02B 26/08
[52] U.S. Cl. ........................................... 356/1; 356/4; 356/5; 356/152; 342/126; 342/458; 350/6.7; 350/6.9
[58] Field of Search ................... 356/1, 4, 141, 152, 356/5; 342/126, 158, 398, 458; 367/103, 119; 350/6.5, 6.7, 6.9, 484, 486

[56] References Cited

U.S. PATENT DOCUMENTS

| | | |
|---|---|---|
| 3,400,398 | 9/1968 | Lapeyre et al. |
| 3,714,657 | 1/1973 | Lapeyre ......................... 356/152 X |
| 4,268,167 | 5/1981 | Alderman ............................... 356/1 |
| 4,700,301 | 10/1987 | Dyke ................................... 356/1 X |

Primary Examiner—Stephen C. Buczinski
Assistant Examiner—Linda J. Wallace
Attorney, Agent, or Firm—Browdy and Neimark

[57] ABSTRACT

A method and system for determining a spatial parameter of an object by generating at least two radiation beams which are rotatably displaced with respect to said object and so as to have, at any instant of time, a known predetermined position with respect to each other. By determining the time interval(s) between successive interceptions of the beams by the object, said parameter may be computed.

15 Claims, 9 Drawing Sheets

DETERMINATION OF ONE OR MORE SPATIAL PARAMETERS OF AN OBJECT

BACKGROUND

This invention relates to the determination of one or more spatial parameters of an object. The invention has particular application in the field of surveying, navigation, earth-moving equipment control, robotics, aeroplane landing, and so on.

Current surveying and navigational measurements fall into two categories: measurement of distance and measurement of both angular elevation and azimuth angle. Distance can be measured by means of the yardstick or, more commonly, nowadays, by measuring the time taken for an electromagnetic signal to be sent from a transmitter and reflected by the object back to the transmitter. The distance travelled by the signal is then equal to twice the distance between the transmitter and the object, thereby enabling the distance easily to be calculated. This method, forms the basis of radar measurements. Measurements of angular elevations are usually made using theodolytes or variations thereof.

SUMMARY OF THE INVENTION

It is an object of the present invention to provide a new and improved method and apparatus for the determination of one or more spatial parameters of an object.

According to a broad aspect of the invention, there is provided a method of determining a spatial parameter of an object comprising the steps of:

generating at least two radiation beams;

rotatably displacing said beams with respect to said object so as successively to be intercepted by said object and so as to have, at any instant of time, a known predetermined position with respect to each other; and determining the time interval(s) between successive interceptions of said beams by said object so as to compute therefrom said parameter.

The invention is essentially based on the fact that if the angular velocity $\omega$ of a beam be known then the angle $\theta$ through which it rotates in a time interval $\Delta t$ is given by:

$$\theta = \omega \Delta t$$

By using at least two beams which are rotated about separate points of origin spaced apart by a known distance, the problem of determining one or more spatial parameters of an object with respect to either of the points of origin, reduces to the solution of the triangle (triangulation) formed by the object and the points of origin.

In a specific application wherein two beams are rotated about a single point of origin with different angular velocities, the problem does not lend itself to the application of triangulation but, on the other hand, allows the angular displacement of the object with respect to a datum plane passing through the point of origin to be determined.

This invention therefore provides, for example, a method for determining the distance of an object from a fixed origin wherein two parallel radiation beams spaced apart by a known distance are rotated with a known constant angular velocity about said origin. Timing means located at the object are used to determine the time interval between successive interceptions of the object by each of the two beams. From a knowledge of this time interval and the distance between the two beams, the distance of the object from the origin can be computed.

In an alternative arrangement, the angular displacement of an object with respect to a fixed plane can be determined by rotating two beams about a common point of origin with known, different, constant angular velocities. By determining the time interval between successive interceptions of the object of each of the two beams, and knowing the angular velocities of both beams, the required angular displacement can be computed.

In another arrangement, the angle subtended at an object by two fixed origins spaced apart by a known distance can be determined by rotating two beams about said origins with equal, known angular velocities. From a knowledge of the time interval between successive interceptions of the object by each of the two beams and the angular velocity of the beams, the required angle can be computed.

Each of these arrangements on its own can be employed to determine at least one spatial parameter of an object; none is effective to determine all those parameters which uniquely define the location of an object. However, a suitable combination of two or more arrangements can be employed in order to determine uniquely the location of an object in space.

A still further arrangement allows the location of an object to be uniquely determined with respect to any one of three fixed origins by rotating three beams about said origins with equal, known angular velocities. From a knowledge of the angular velocity of each beam as well as the two time intervals between successive interceptions of the object by each of the three beams, the angles subtended at the object by the lines joining each of the origins can be determined. A knowledge of these angles can be used together with the distance between the origins in order to compute the distance of the object from any of the origins and also its angular displacement with respect to same.

The beams may be narrow focussed beams or, alternatively, may be fan-shaped in cross-section. In this case, angle measurements can more easily be made outside of the plane of the transmitter.

The accuracy of the invention depends on the accuracy with which the time intervals can be measured. It will be appreciated that any inherent inaccuracy in the timing means will tend to be cancelled when two measurements are subtracted in order to determine a time interval.

The system or apparatus for carrying out the method in accordance with the invention involves the use of receiver means located at the object whose position is to be measured relative to the transmitter means. The receiver means are sensitive to the beams of electromagnetic rays which are emitted by the transmitter means. Timing means are provided in association with the receiver means, such that the difference in time taken for successive beams to hit the object may be measured. The difference in time taken for any two beams to hit the object may be interpreted as the angle subtended at the object by a line joining the two respective transmitter means. Since the distance between the two transmitter means is known, the system reduces to a triangle, the base of which is the known distance between the two transmitters and the apex angle of which is derived in the manner previously described. Such a triangle is not unique but will become so if any other length or angle in the triangle be known.

The transmitter means can comprise two parallel beams separated by a known distance which rotate in exact synchronism about a common point of origin which is, preferably, mid-way along the base of the two beams. Receiver means located at the object are sensitive to the transmitted radiation, and are provided also with timing means in order to measure the time difference for the two beams to hit the object. Since the beams rotate with identical, known angular velocities, this difference in time can be interpreted as the angular displacement swept between the two beams as they are successively intercepted by the object. This permits determination of the apex angle subtended at the object by a line joining the axes of the two rotating beams. Moreover, in the right-angled triangle joining the object to a line comprising half the base between the two beams the apex angle is equal to half of the said determined angle and the distance between the two beams is known. Hence, the distance from the object of the transmitter origin can be derived.

Alternatively, the two beams can be arranged to rotate about a common axis at different, known angular velocities. Preferably, it is arranged that at the start of a measurement the two beams are coplanar with a predetermined datum plane. The difference in time for each beam successively to be intercepted by the object provides a measure of the angular displacement of the object relative to a line through the common points of origin of the beams through the said datum plane.

In accordance with a further variation, two beams are rotated about separate centres spaced a known distance apart. The two beams are in phase and rotate with identical angular velocities. The difference in time for the object successively to be intercepted by the two beams provides a measure of the angle subtended at the object by the line joining the point of origin of the two beam sources.

In accordance with a still further variation, three beams are rotated about separate centres spaced a known distance apart. The three beams are in phase and rotate with identical velocities. The differences in time for the object successively to be intercepted by each of these three beams provide a measure both of the angles subtended at the object by each of the lines joining the source of the middle beam to each of the other sources; as well as providing a measure of the distances from the object to the respective points of origin of each of the three sources.

BRIEF DESCRIPTION OF THE DRAWINGS

The invention will now be described by way of example and with reference to various characteristics embodiments thereof and with reference to the accompanying drawings in which:

FIGS. 4a-f are diagrammatic representations at different intervals of time of a system for generating beams with differing angular velocities;

FIGS. 5a, b are perspective and part-plan views of a measuring system which operates on the basis of the systems shown in FIGS. 1, 3 and 4;

DESCRIPTION OF THE EMBODIMENTS SHOWN IN THE DRAWINGS

Figure 1:
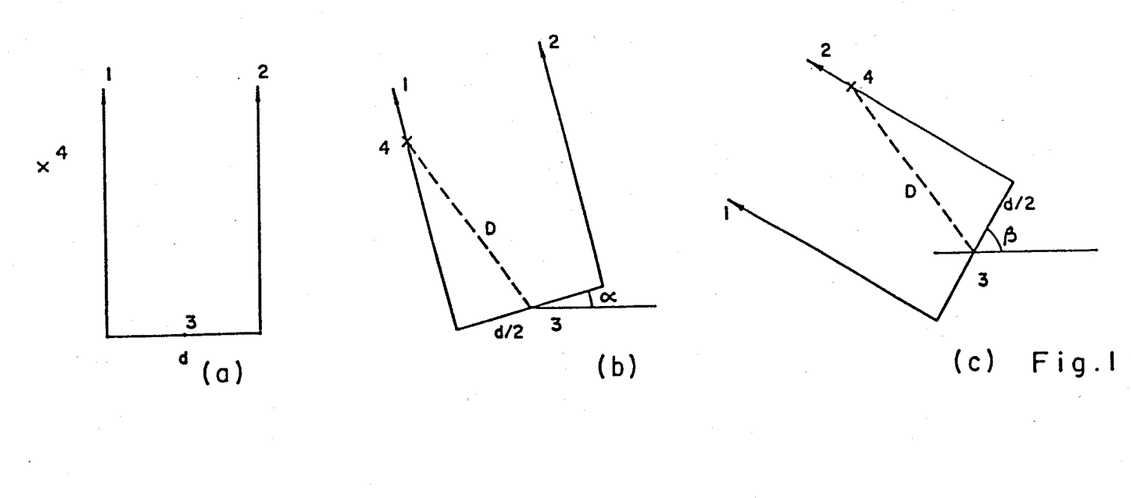
FIGS. 1a, 1b and 1c show schematically a parallel beam system rotating about a common point of origin at differing stages of rotation.

Referring to FIG. 1, there is shown schematically a transmitter system comprising two parallel beams 1 and 2, spaced apart a known distance d and constrained to rotate about a point of origin 3. Point 4 within the range of the two beams represents an object whose location in space relative to the point of origin 3 is to be determined. If the beams rotate about the origin 3 in a counter-clockwise direction, then let it be assumed that the object 4 will be hit by beam 1 when the parallel beam system has rotated through angle $\alpha$ (FIG. 1b). There will then be a time delay $\Delta t$ before the object 4 is hit by beam 2 which will have rotated through a total angle of $\beta$ (FIG. 1c). This time delay $\Delta t$ is measured and, by relating it to the angular velocity of the parallel beam system, the angular displacement $\beta - \alpha$ of the parallel beam system between the two beams successively striking the object 4 can be deduced. That is to say, the angular displacement $\beta - \alpha$ of the parallel beam system is equal to $\omega \Delta t$ where $\omega$ is the angular velocity of the parallel beam system and $\Delta t$ is the time difference between the two beams successively striking the object.

This basic principle of relating time to angular displacement is fundamental to all the embodiments of the invention and will therefore be explained in more detail. If, for example, a beam system rotates at an angular velocity of 60 rpm, then clearly it will rotate one revolution per second. Thus, if the time difference between two beams of such a system striking a object be equal to 0.1 second, the beam system will have rotated through an angle of 36°.

Figure 2:
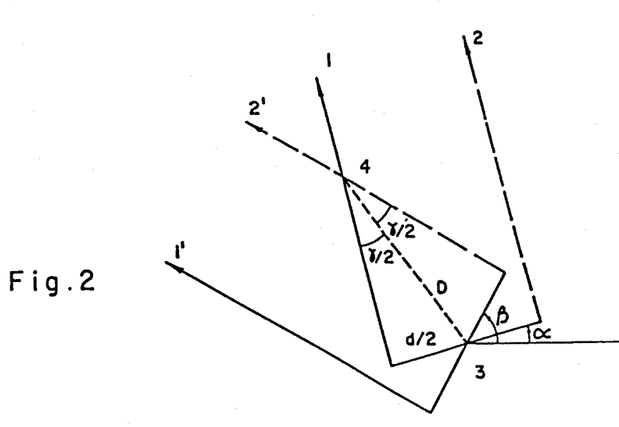
FIG. 2 illustrates the trigonometrical basis for the parallel beam system shown in FIG. 1.

Reference will now be made to FIG. 2, from which it will be seen that in an arrangement as described with respect to FIG. 1, wherein:

d is the distance betwen beams 1 and 2

$\gamma$ is the difference in the angular displacement of the beams 1 and 2 as they successively strike the object ($\gamma = \beta - \alpha$)

D is the distance of the point of origin 3 of the transmitter system from the object 4 then D =

$$D = \frac{d/2}{\sin(\gamma/2)}$$

where $\gamma = \omega \Delta t$

Thus D, the distance of the transmitter origin from the object can be computed in terms of the detected, measured $\Delta t$ and the known values for d and $\omega$.

It is thus clear that this system affords a simple means of determining the angular displacement between two beams which successively strike a object and, using simple trigonometry, enables the distance from the object to the transmitter to be determined.

Figure 3:
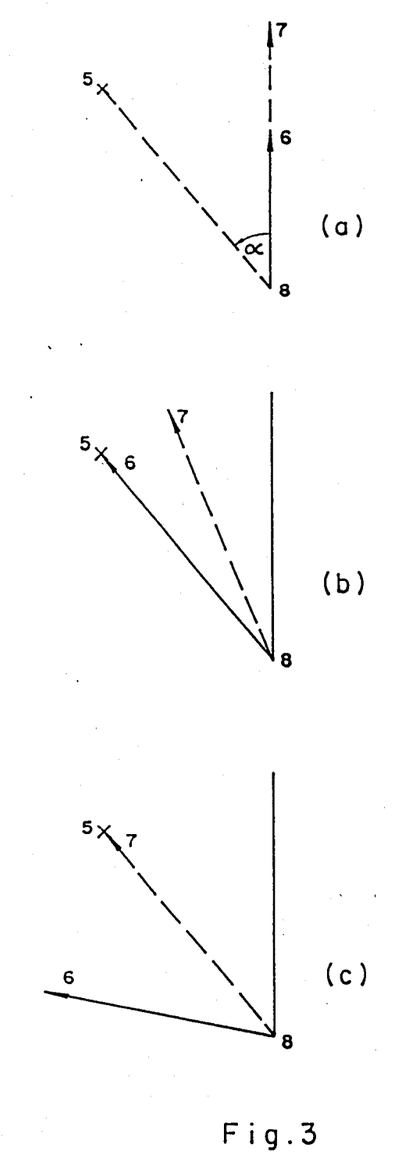
FIGS. 3a, 3b and 3c show schematically a two-beam system rotating at different angular velocities at differing stages of rotation.
Figure 4:
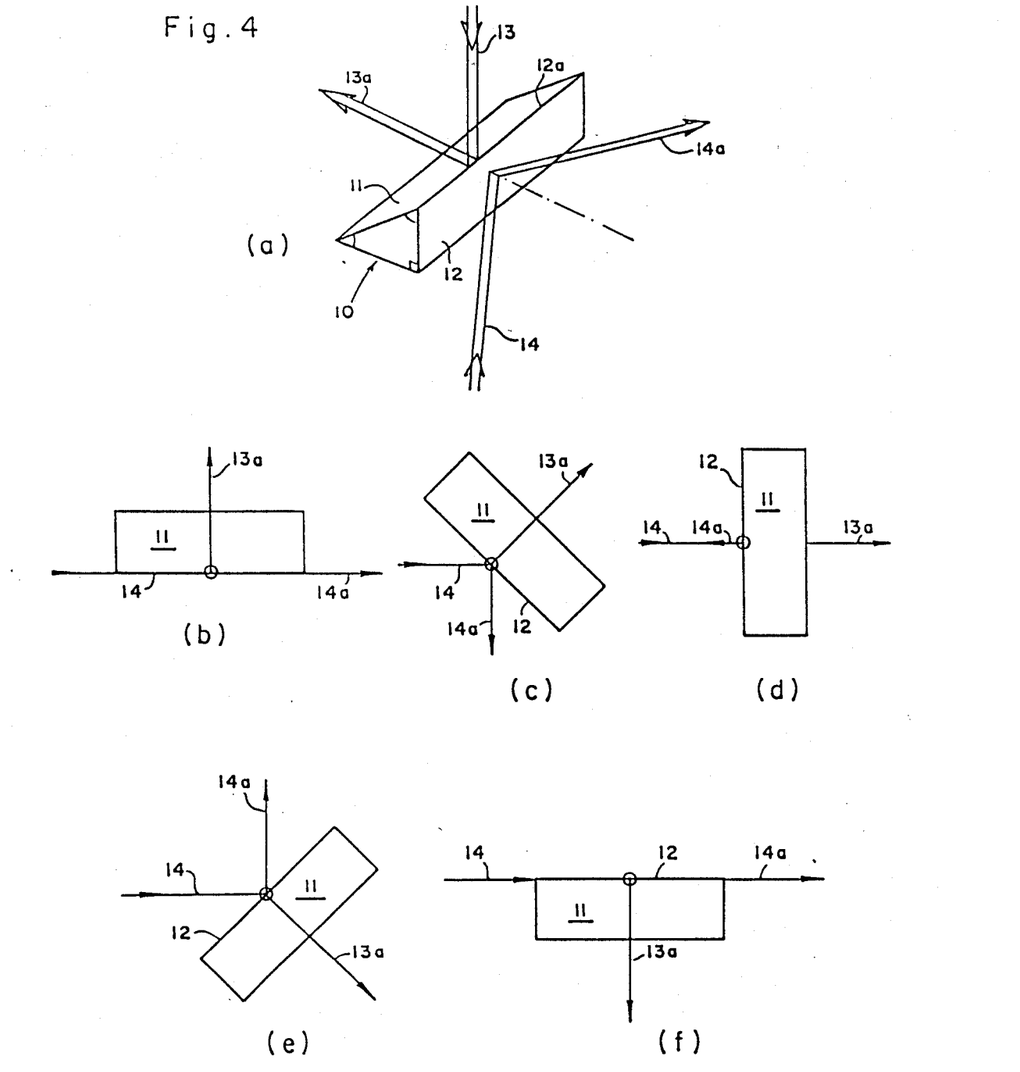

Reference will now be made to FIG. 3 which illustrates schematically an embodiment according to the invention for the measurement of the angular displacement of an object 5 with respect to a datum plane wherein is provided a transmitter system comprising two beams 6 and 7 originating from the same point of origin 8 and rotating in the same plane at different angular velocities. FIG. 3(a) shows an initial condition where the beams are coincident at a datum plane with reference to which plane α is to be measured. It is assumed that beams 6 and 7 rotate at different angular velocities in a counter-clockwise direction and that beam 6 rotates at a faster speed than beam 7. FIG. 3(b) then shows an intermediate condition where beam 6 strikes the object 5 thereby activating timing means situated at the object. FIG. 3(c) shows a final condition where beam 7 strikes the object 5 thereby stopping the timing means situated at the object. The difference in time Δt taken for each beam successively to hit the object 5 is a function of both the difference in angular velocities of the two beams and the angle α.

It can be shown that if, in FIG. 3
α is the angle required to be measured
ω1 is the angular velocity of the first beam
ω2 is the angular velocity of the second beam
Δt is the time difference between the two beams successively hitting the object
then α=

$$\alpha = \frac{\omega_1 \omega_2}{\omega_1 - \omega_2} \Delta t$$

This means that the difference in time between beams 6 and 7 successively striking the object 5 provides an exact measure of α, i.e. the angular displacement of the object relative to a line in the datum plane through the origin of the beams.

Reference will now be made to FIGS. 4a–4f of the drawings, wherein is illustrated schematically a system for generating the rotating beams described above with reference to FIG. 3 of the drawings, wherein are produced two rotating beams which rotate about a common axis such that one beam rotates at twice the angular velocity of the other. The system comprises an optical block 10 having a first plane reflecting surface 11 inclined at an angle of 45° with respect to a second plane vertical reflecting surface 12, the two surfaces 11 and 12 having a common apical line 12a. The arrangement is as shown in isometric view in FIG. 4a. A first incident light beam 13 is directed from above towards the apical line 12a and parallel to the surface 12. The light beam is sufficiently broad that a portion thereof is reflected by the inclined reflecting surface 11 as a reflected beam 13a at an angle of 90° to the incident beam 13. A second incident light beam 14 is directed in a horizontal plane towards the vertical reflecting surface 12 and is reflected by it as a reflected beam 14a.

FIGS. 4b–4f show what happens to the two reflected beams, 13a and 14a, as the block 10 rotates. Beam 13a simply rotates with the same angular velocity as the block 10. However, as will be seen from FIG. 4c, when block 10 has rotated through 45° from the position shown in FIG. 4b, beam 14a will have rotated through 90°, i.e. twice the angular rotation of the block and thus of beam 13a. FIGS. 4d–4f show the situation after the block and beam 13a have rotated through 90°, 135° and 180° respectively. It will thus be seen that in this arrangement beam 14a rotates at twice the angular velocity of beam 13a.

After the block 10 has rotated through 180°, corresponding to the situation shown in FIG. 4f, the reflecting surface 12 is no longer presented to light beam 14. However, by this time, beam 14a will already have rotated through 360° so that the system is thus operative over the complete 360° cycle.

Figure 5:
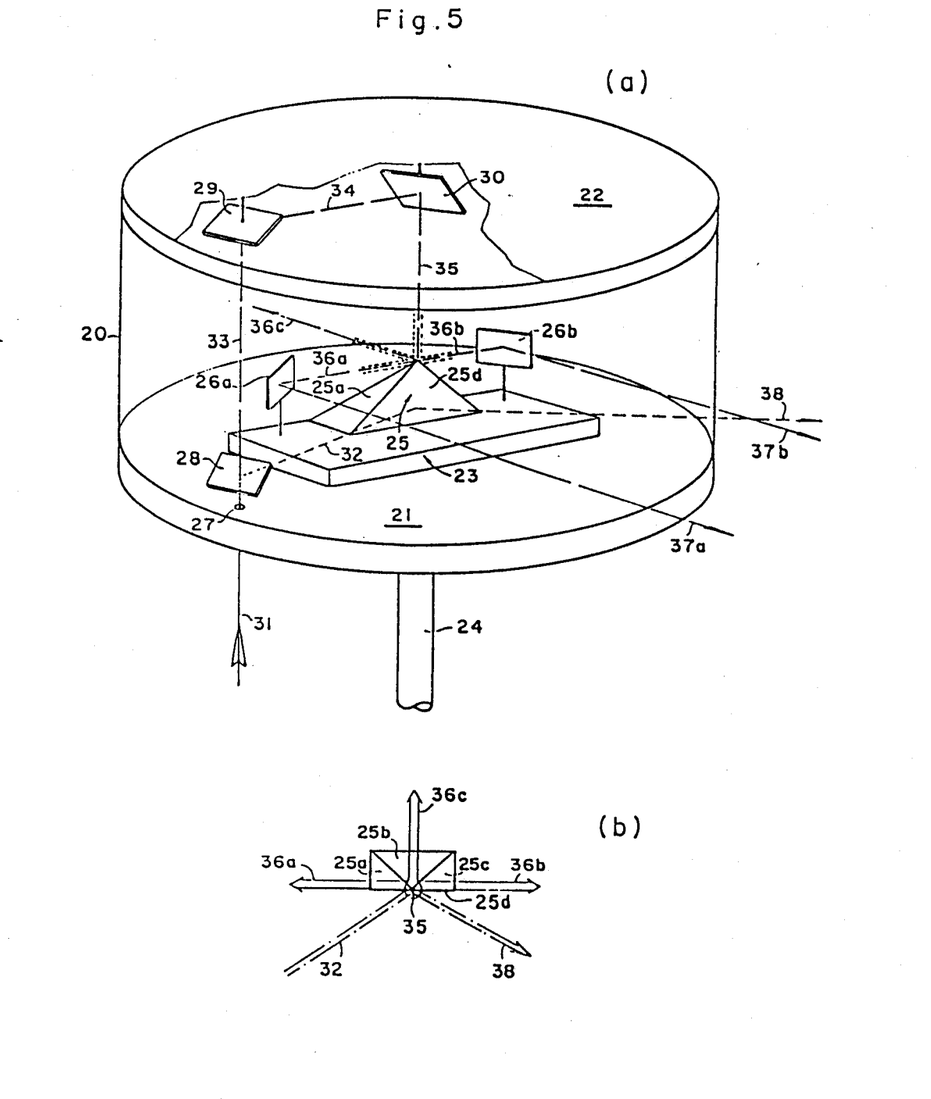

Reference will now be made to FIG. 5 which illustrates a practical embodiment for generating a first pair of parallel beams spaced apart by a known distance and which rotate in synchronism with known angular velocity about a point of origin equidistant from the two beams (as described with reference to FIG. 1 of the drawings); and a second pair of beams, one of which rotates at twice the angular velocity of the other (as described with reference to FIG. 3 of the drawings).

The system shown in FIg. 5a comprises a transparent cylinder 20 with an opaque base portion 21 and an opaque top portion 22. A table 23 is rotatably mounted on the base portion 21 and is coupled to a drive shaft 24 which passes through the base portion 21 so as to be free to rotate with respect thereto. Mounted on the table 23 is a prism-shaped block 25 with three mutually adjacent reflecting faces 25a, 25b and 25c inclined at 45° to the remaining, vertical face 25d. Also mounted on the table 23 are two reflecting surfaces 26a and 26b whose orientation is described below. An aperture 27 is formed in the base portion 21. Mounted on the base portion 21 is a semi-reflecting surface 28 which is orientated at an angle of 45° to the base portion 21 and with its reflecting surface directed towards the plane reflecting surface 25d of the prism shaped block 25.

Suspended from the top portion 22 of the cylinder 20 is a first reflecting surface 29 which is orientated parallel to the semi-reflecting surface 28. Also suspended from the top portion 22 of the cylinder 20 is a second reflecting surface 30 mounted in line with the apex of the prism shaped block 25 and with the first reflecting surface 29 as explained below.

The system just described is employed as follows. Through the aperture 27 in the base portion 21 of the transparent cylinder 20, is directed a broad beam of light 31 which can, for example, be derived from a suitable laser source. The beam of light 31 strikes the semi-reflecting surface 28 which is orientated at an angle of 45° to the incident light beam 31 such that there are generated a reflected beam 32 and a transmitted beam 33. The transmitted beam 33 strikes the reflecting surface 39 orientated at an angle of 45° to the incident beam 33 such that there is generated a reflected beam 34. This strikes the reflecting surface 30 also orientated at an angle of 45° with respect to the incident beam 34 and mounted directly in line with the apex of the prism-shaped block 25. Consequently, the incident beam 34 is reflected as a beam 35 whose centre strikes the apex of the prism-shaped reflector block 25. Since the initial beam 31 is broad, beam 35 will also have breadth associated with it and will consequently strike the three sloping reflecting surfaces of the prism-shaped reflector block 25. This is shown more clearly in plan view in FIG. 5(b) from which it will be seen that each of the three sloping reflecting surfaces 25a, 25b and 25c of the prism shaped block 25 will reflect a portion of the incident beam 35. Reflected beams 36a and 36b are colinear but directed in opposite directions towards the plane reflecting surfaces 26a and 26b respectively, each of which is orientated at an angle of 45° to said beams such that the reflected beams 37a and 37b corresponding to the incident beams 36a and 36b, respectively, will be parallel. Beam 36c which is reflected from the third sloping surface of the prism-shaped reflector block 25 will be parallel to the set of parallel beams 37a and 37b, but pointing in the opposite direction.

Beam 32 is directed towards the planar surface of the prism-shaped reflector block 25 and is reflected as beam 38. It will be clear that beams 36c and 38 in FIG. 5 correspond to the beams 13a and 14a respectively in FIG. 4 and, as explained with reference to that figure, the beam 38 rotates at twice the angular velocity of beam 36c.

With the arrangement shown in FIG. 5 there are thus generated two parallel beams 37a and 37b which rotate about a common point of origin (the apex of the prism-shaped reflector block 25) and a second set of beams 36c and 38 which rotate about the same point of origin, but wherein beam 38 rotates at twice the angular velocity of beam 36c.

Figure 6:
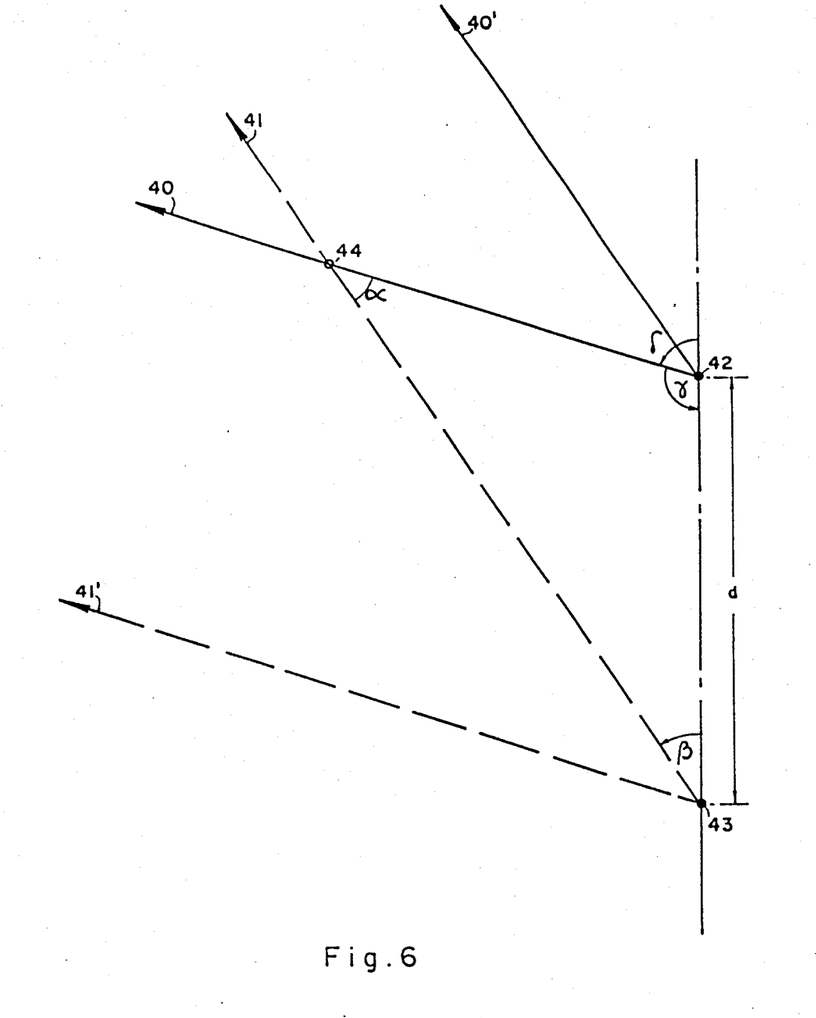
FIG. 6 illustrates the trigonometrical basis for a two-beam non-coaxial system as shown in FIG. 7.

Reference will now be made to FIG. 6, which shows schematically the trigonometrical basis of an embodiment to be described with reference to FIG. 7 wherein two parallel beams 40 and 41 separated by a fixed, known distance, d, rotate in a counter-clockwise direction about their respective, different points of origin 42 and 43. This embodiment is designed to measure the angle $\alpha$ which is subtended at an object 44 by the line joining the two points of origin 42 and 43 of the beams 40 and 41, respectively.

It will be seen from FIG. 6 that if the object 44 be on the left-hand side of the line joining the two beam sources, then since the beams are rotating in a counter-clockwise direction, beam 41 will strike the object before beam 40. This follows since relative to the line joining the two beam sources, beam 41 subtends a smaller angle at the object than does beam 40. When beam 41 strikes the object 44, beam 40 will be in the position shown as 40'. Likewise, when beam 40 strikes the object 44, beam 41 will have progressed to position 41'. In the triangle defined by the points of origin 42, 43 of the two beam sources and the object 44, angles $\alpha$, $\beta$ and $\gamma$ are as shown in FIG. 6. Angle $\delta$, which is an exterior angle of the triangle, is the angle through which beam 40 rotates before striking the object; and angle $\beta$ is the corresponding angle through which beam 41 rotates before striking the object. The difference between these two angles, $\delta - \beta$ is equal to $\alpha$, namely the angle subtended at the object by the line joining the two beam sources.

Since beams 40 and 41 are rotating at the same angular velocity, it follows that the magnitudes of angles $\beta$ and $\delta$ will be proportional to the times taken for beams 41 and 40 respectively to strike the object 44. It should be understood that the magnitudes of angles $\beta$ and $\delta$, individually, are not known but only their difference which is related to the difference in times for the object 44 to be intercepted by beams 41 and 40, respectively. It will be appreciated that in the triangle joining the object 44 to the two points of origin 42 and 43, only the base, d, and the angle $\alpha$ are known. This does not define a unique triangle and, therefore, the location of point 44 is not uniquely determined. Thus, in the triangle whose base is the line joining the two points of origin 42 and 43 and whose apex is the object 44, the base distance, d, is known and the apex angle $\alpha$ can be determined.

However, if an embodiment according to this scheme be used in conjunction with the previous embodiment which determines the angular displacement with respect to a plane through the point of origin of two beams rotating with different angular velocities, and if the origin of these beams is arranged to coincide with one of the points of origin 42 of 43 and the reference plane is arranged to contain the base of the defined triangle, then one side and two angles of this triangle can be determined. Such a triangle is unique and consequently with such a combined embodiment, the location of a point in space with respect to a point of origin may be uniquely determined.

Figure 7:
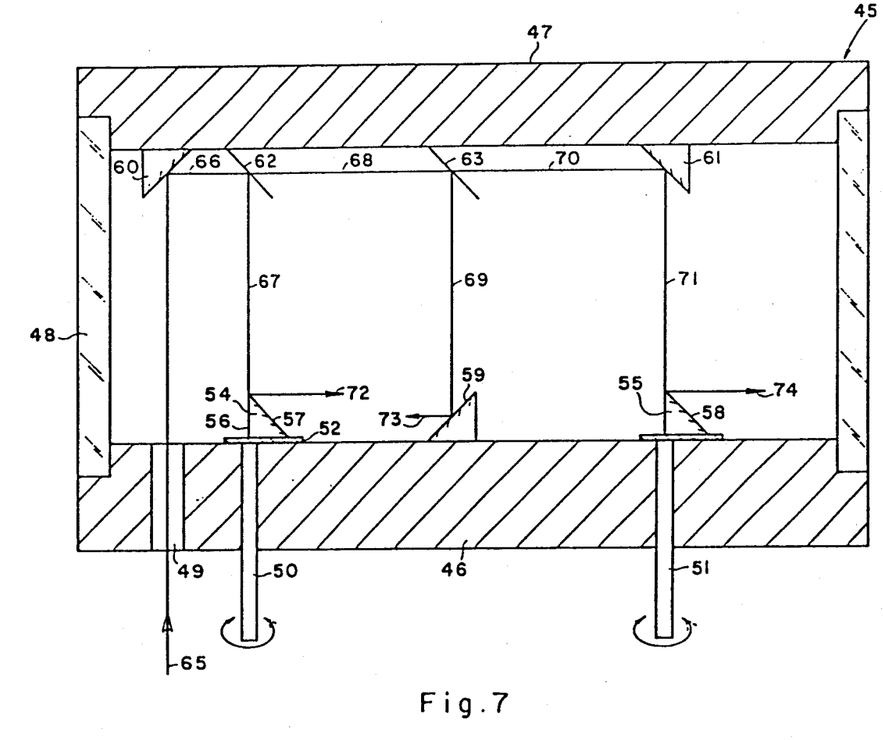
FIG. 7 is a sectional view of a measuring system which operates on the basis of the systems shown in FIGS. 4 and 6.

Reference is now made to FIG. 7, which illustrates a practical implementation for such a combined embodiment. In this system, there is provided a cylinder 45 comprising a base portion 46 and a top portion 47 and a transparent cylindrical wall 48. In the base 46 is formed an aperture 49 and two rotating shafts 50 and 51 extend through the base 46. The lower ends of shafts 50 and 51 may be rotated in synchronism by rotating means (not shown) and on the opposite ends of shafts 50 and 51 are mounted tables 52 and 53, respectively, which are thus free to rotate with respect to the base portion 46. Fixed to the tables 52 and 53 are reflector blocks 54 and 55 respectively. Reflector block 54 comprises a plane reflecting surface 56 perpendicular to the base portion 46 to which a second plane reflecting surface 57 is inclined at an angle of 45°. Reflector block 55 comprises a single plane reflecting surface 58 inclined at an angle of 45° to the base portion 46. A third reflector block with a single plane reflecting surface 59, also inclined at an angle of 45° to the base portion 46, is located on top of the base portion 46 between two reflector blocks 54 and 55. Plane reflecting surfaces 60 and 61 inclined at an angle of 45° to the base portion 46 are located directly above the aperture 49 and the upper end reflector block 55, respectively. Beam splitters 62 and 63 are located directly above reflector blocks 54 and 55, respectively.

A broad beam of light 65 is directed through the aperture 49 in the base 46 so that it strikes the inclined reflecting surface 60. It is reflected as a beam 66 which strikes the beam splitter 62. It is now reflected as beam 67 and transmitted as beam 68. The transmitted component 68 strikes the second beam splitter 63 from which it is reflected as beam 69 and transmitted as beam 70. The transmitted component 70 strikes the reflecting surface 61 from which it is reflected as beam 71 at an angle of 90° to the incident beam 70. Beams 67, 69 and 71 are sufficiently broad that beams 67 and 71, in particular, will be reflected through 90° when they strike the inclined reflecting surfaces 57 and 58, respectively, of reflector blocks 54 and 55. Thus, beam 67 strikes the inclined surface of block 54 and is reflected as a beam 72 which rotates in synchronism with shaft 50. Beam 69 strikes the inclined reflecting surface of block 59 and is reflected as beam 73 and beam 71 strikes the inclined reflecting surface 58 of block 55 and is reflected as a beam 74 which rotates in synchronism with shaft 51.

Throughout half the revolution of reflector block 54, the reflecting surface 56 of block 54 will intercept the beam 73. This arrangement therefore generates a further beam (not shown) caused by the reflecton of incident beam 73 on the rotating plane surface 56 of reflector block 54, which reflected beam rotates at twice the angular velocity of beam 72.

This embodiment, therefore, provides two independent beams 72 and 74 which rotate in synchronism with the shafts 50 and 51; as well as providing a third beam (not shown) coaxial with beam 72 but rotating at twice its angular velocity.

The embodiments described so far with reference to FIGS. 1, 2, 3 and 6 provide means of determining a single spatial parameter of a object. According to the first embodiment (described with reference to FIGS. 1 and 2), the distance of a point in space from a prescribed point of origin may determined; and according to the second and third embodiments (described with reference to FIGS. 3 and 6 respectively), the angular displacement of a point in space relative to two prescribed points of origin, may be determined. Combining these embodiments and effecting two independent measurements as is done in the embodiment described with reference to FIG. 5 would obviously provide a method of determining, uniquely, the location of a point in space. However, there will now be described an embodiment of the invention which provides a simpler, more direct means of determining the location of a point in space without recourse to determining its distance and angular displacement separately.

Figure 8:
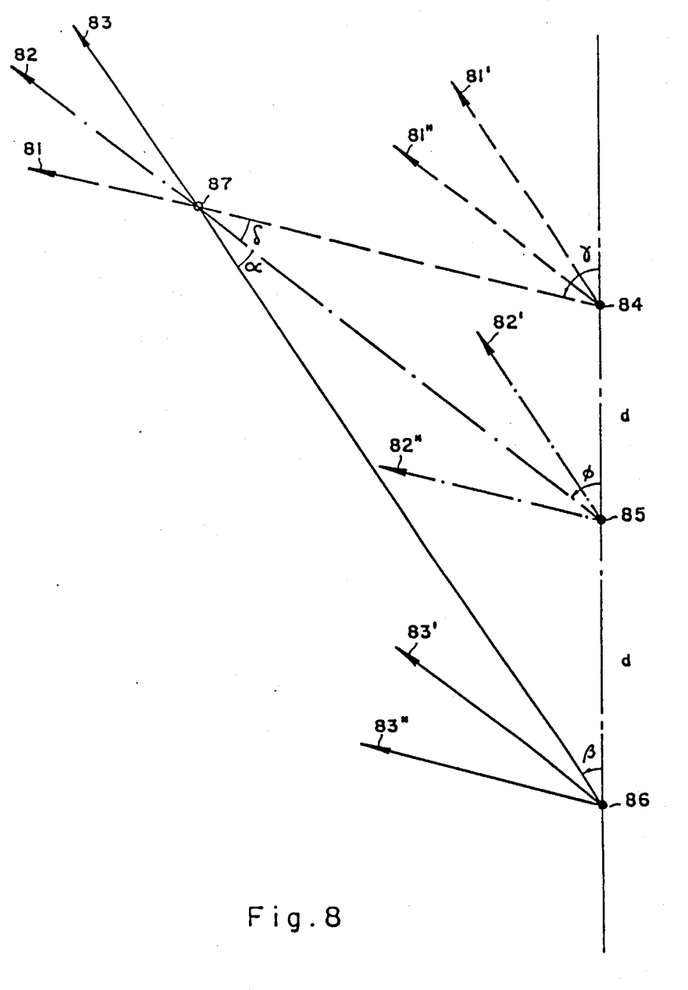
FIG. 8 illustrates the trigonometrical basis of a three-beam non-coaxial system as shown in FIG. 9.

Reference is made to FIG. 8 which shows schematically such an embodiment. Beams 81, 82 and 83 rotate in synchronism about their respective origins 84, 85 and 86. The distance of the point of origin 85 from either of the points of origin 84 and 86 is equal to d. An object 87 is intercepted by beam 83 when it has rotated through an angle $\beta$; by beam 82 when it has rotated through an angle $\phi$ and by beam 81 when it has rotated through and angle $\gamma$. It will be seen from FIG. 8 that when beam 83 strikes the object, beams 81 and 82 will have reached points 81′ and 82′, respectively; when beam 82 strikes the object, beams 81 and 83 will have reached points 81″ and 83′, respectively; and when beam 81 strikes the object, beams 82 and 83 will have reached points 82″ and 83″, respectively. Receiver means (not shown) located at the object 87 enable two measurements to be made: the difference in time for the object 87 to be intercepted by beams 83 and 82; and the difference in time for the object 87 to be intercepted by beams 82 and 81. These enable apex angles $\alpha$ and $\delta$ to be determined in exactly the same way as was explained with reference to FIG. 6. From a knowledge of both these angles, as well as the distances between the point of origin 85 and the points of origin 84 and 86, respectively, the distance of the object 87 from any of the points of origin 84, 85 or 86 may be derived.

Thus, with reference to FIG. 8, if d = distance between adjacent beam sources
D = distance from beam source 86 to the object 87
z = ratio sin $\beta$/sin $\phi$
$\alpha$ is the angle subtended at the object by beams 82 and 83
$\delta$ is the angle subtended at the object by beams 81 and 82 then it can be derived, using sample trigonometry, that $$4d^2 = D^2[1 + z^2 - 2z \cos(\alpha + \delta)]$$

For a given system, distance d is known and variables z, $\alpha$ and $\delta$ are derived from measurements of the time intervals between beams 83, 82 and 81 striking the object 87. Hence the equation can be solved for D.

It will thus be apparent that a 3-beam system in accordance with FIG. 8 provides measurements of the distance of a object from a transmitter as well as its angular displacement relative to the transmitter.

Figure 9:
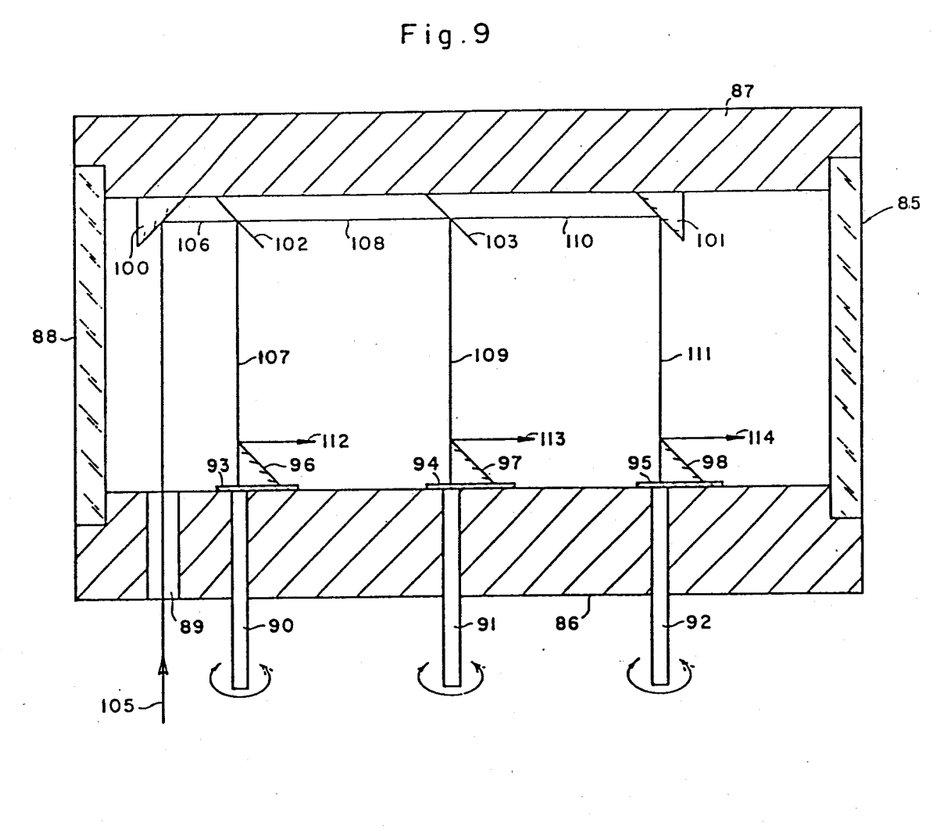
FIG. 9 is a sectional view of a measuring system which operates on the basis of the system shown in FIG. 8.

Reference will now be made to FIG. 9 which illustrates a practical implementation for the embodiment shown schematically in FIG. 8. There is provided a cylinder 85 comprising a base portion 86 and a top portion 87 surrounded by a transparent window 88. In the base portion 86 are provided an aperture 89 and three equally spaced shafts 90, 91 and 92 which are connected to rotating means (not shown) such that they can be rotated in exact synchronism with one another. Attached to the opposite ends of the shafts 90, 91 and 92, in such a way that they rotate with said shafts, are tables 93, 94 and 95, which are thus free to rotate with reflecting blocks 96, 97 and 98, respectively, whose reflecting surfaces are all inclined at an angle of 45° to the base portion 86. Directly above the aperture 89 is a reflector block 100 whose reflecting surface is inclined at an angle of 45° to the top portion 87, and directly above the reflector block 98 is a reflector block 101 whose reflecting surface is also inclined at an angle of 45° to the top portion 87. Directly above the top portions of reflector blocks 96 and 97 are beam splitters 102 and 103, respectively, both inclined at an angle of 45° to the top portion 87. The reflecting surface of the reflector block 101 and also the beam splitters 102 and 103 are all orientated towards the reflecting surface of reflector block 100.

A broad beam of light 105 is directed through the aperture 89 in the base 86 towards inclined reflecting surface 100 such that the reflected beam 106 is inclined at an angle of 90° to the incident beam 105. It is reflected by beam splitter 102 through a further 90° as beam 107 and transmitted by beam splitter 102 as beam 108. The transmitted beam 108 is in turn reflected through 90° as beam 109 by beam splitter 103 and is transmitted by it as beam 110. The transmitted beam 110 is, in turn, reflected by the reflector 101 through 90° as beam 111. Beams 107, 109 and 111 are sufficiently broad that when they hit the apexes of reflector blocks 96, 97 and 98, respectively, they are reflected through 90° by the inclined reflecting surfaces of these reflector blocks as beams 112, 113 and 114 respectively. As shafts 90, 91 and 92 rotate so, too, will reflector blocks 96, 97 and 98 which are fixed to the tables 93, 94 and 95, respectively, attached to the shafts. Thus, beams 112, 113 and 114 will rotate with the rotating reflector blocks in exact synchronism with each other on account of the synchronism of the rotating shafts.

This embodiment therefore provides for three beams 112, 113 and 114 to rotate in synchronism with each other about independent shafts 90, 91 and 92 equally spaced from one another.

Although the invention has been described with reference to beams of light, it will be appreciated that any type of electromagnetic radiation may be employed such as, for example, radio frequency beams and so on.

I claim:

1. A method of determining the angular displacement of an object with respect to a fixed plane, comprising the steps of:
   generating first and second radiation beams;
   rotatably displacing said beams about a common point of origin lying in said plane with different, constant predetermined angular velocities so as successively to be intercepted by said object and so as to have, at any instant of time, a known predetermined position with respect to each other, whereby said angular displacement with respect to said plane may be computed from the time interval between successive interceptions of said beams by said object.

2. A method according to claim 1 wherein said beams are initially substantially aligned with said plane.

3. A method for determining the angle subtended at an object by two points of origin spaced apart a predetermined distance, comprising the steps of:
generating first and second radiation beams;
rotatably displacing said beams about said points of origin with equal, constant predetermined angular velocities and with a predetermined angular displacement between said beams so as successively to be intercepted by said object and so as to have, at any instant of time, a known predetermined position with respect to each other, whereby said angle is computed from the time interval between successive interceptions of said beams by said object.

4. A method in accordance with claim 3 wherein said predetermined angular displacement is substantially zero.

5. A method of determining both the distance of an object from a point of origin and also the angular displacement of the object with respect to a fixed plane passing through said point of origin, wherein:
first and second parallel beams are rotated in phase about said point of origin with a constant, predetermined angular velocity; and
third and fourth beams are rotated about said point of origin with different, constant, predetermined angular velocities, so that said distance may be computed from the time interval between successive interceptions of said first and second beams by said object and said angular displacement with respect to said plane may be computed from the time interval between successive interceptions of said third and fourth beams by said object.

6. A method for determining both the distance of an object from a first point of origin and the angular displacement of said object with respect to a fixed plane passing through said point of origin, comprising the steps of:
generating first, second and third rotation beams;
rotatably displacing said first beam about said point of origin with a known, predetermined angular velocity;
rotatably displacing said second beam about a second point of origin having a known, predetermined relative spacing from said first point of origin with an equal angular velocity and phase to said first radiation beam so as to determine the angle subtended at the object by said first and second points of origin in combination with said first radiation beam; and
rotatably displacing said third beam about said first point of origin with a different, constant, predetermined angular velocity so as to determine said angular displacement in combination with said first radiation beam;
thereby enabling said distance to be computed also by triangulation.

7. A method of deriving the loaction of an object with respect to a fixed point of origin, comprising the steps of:
generating first, second and third radiation beams;
rotatably displacing said first beam about said point of origin at a constant, predetermined angular velocity;
rotatably displacing said second beam at said angular velocity about a second point of origin displaced a known first distance from said first point of origin and with known first angular displacement with respect to said first radiation beam; and
rotatably displacing said third beam at said angular velocity about a third point of origin displaced a known second distance from said second point of origin and with known second angular displacment with respect to said second radiation beam; whereby:
a first time interval between successive interceptions of said first and second beams by said object enables a first angle subtended at the object by said first and second points of origins to be determined, and
a second time interval between successsive interceptions of said second and third beams by said object enables a second angle subtended at the object by said second and third points of origin to be determined;
these angles being used together with the known distances between the three said points of origin to derive the location of the object with respect to any of the points of origin.

8. A method according to claim 7 wherein said first and second angular displacements are zero.

9. A method according to claim 7 wherein said first distance is equal to said second distance.

10. A system for determining the angular displacement of an object with respect to a fixed plane, said system comprising:
transmitter means including beam generating means for generating at least two parallel radiation beams having a predetermined relative spacing and rotating means for rotating said beams with respect to said object in synchronism about corresponding points of origin respectively aligned with said beams so as to be intercepted by said object and so as to have, at any instant in time, a known angular velocity and a known predetermined position with respect to each other; and
receiver means, to be associated with said object and responsive to said beams for determining time interval(s) between successive interceptions;
such that said angular displacement is determined as a function of said time interval(s) and said angular velocity.

11. A system according to claim 10 wherein said beam generating means generate three parallel beams having a predetermined relative spacing and wherein said rotating means rotate said beams in synchronism about respective points of origin respectively aligned with said beams.

12. A system according to claim 10 wherein said beam generating means generates a pair of beams and wherein said rotating means rotate said beams about a common point of origin at respectively differing angular velocities.

13. A system according to claim 12 wherein said generating means comprises:
a reflector block having first and second mutually inclined reflector surfaces with a common apex;
means for directing a first broad beam on to said apex substantially parallel with said first surface so that a portion of the beam is reflected from said second surface as a first reflected beam;

means for directing a second beam on to said first surface so as to produce a second reflected beam; and rotating means for rotating said block about an axis coincident with said first beam whereby said first and second reflector beams rotate with differing angular velocities.

14. A system for determining the distance of an object from a fixed point of origin, said system comprising:

transmitter means including beam generating means for generating two parallel radiation beams and rotating means for rotating said beams in synchronism about said point of origin with respect to said object so as to be intercepted thereby, and receiver means, to be associated with said object and responsive to said beams for determining the time interval between successive interceptions;

said generating means including:

a reflector block having first and second mutually inclined reflector surfaces with a common apex;

means for directing a first broad beam along a line passing through said point of origin on to said apex substantially equiangular to both surfaces so that a portion of the beam is reflected by said surfaces in opposite directions along a straight line as first and second reflected beams, respectively;

reflecting means in assembly with said reflector block and inclined at an angle of 45° to said first and second reflected beams for intercepting said beams and reflecting them as parallel third and fourth beams; and rotating means for rotating said assembly of reflector block and reflecting means about an axis coincident with said first beam whereby said parallel third and fourth reflected beams are spaced apart a known displacement and rotate about said point of origin so as successively to intercept said object, said distance being determined from said displacement and said time interval.

15. A system for determining the location of an object with respect to a fixed point of origin, said system comprising:

transmitter means including beam generating means for generating a pair of parallel radiation beams adapted to rotate in synchronism about said point of origin and a pair of radiation beams adapted to rotate about said point of origin with differing angular velocities, and receiver means, to be associated with said object and responsive to said beams for determining the time intervals between successive interceptions;

said generating means including:

a reflector block having first, second, third and fourth mutually inclined reflecting surfaces with a common apex;

means for directing a first broad beam on to said apex substantially parallel with said first surface and equiangular with said second and third surfaces so that a first portion of the beam is reflected from said second surface as a first reflected beam and a second portion of the beam is reflected from said third and fourth surfaces in opposite directions along a straight line as second and third reflected beams, respectively;

means for directing a second beam on to said first surface so as to produce a fourth reflected beam;

reflecting means in assembly with said reflector block and inclined at an angle of 45° to said second and third reflected beams for intercepting said beams and reflecting them as parallel third and fourth beams; and rotating means for rotating said assembly of reflector block and reflecting means about an axis coincident with said first beam whereby said parallel third and fourth reflected beams rotate about said point of origin and said first and fourth reflected beams rotate with differing angular velocities;

whereby said time intervals enable the location of the object with respect to said point of origin to be determined.

* * * * *